US012258008B1

United States Patent
Kurutach et al.

(10) Patent No.: US 12,258,008 B1
(45) Date of Patent: Mar. 25, 2025

(54) OBJECT COLLISION PATH PREDICTION

(71) Applicant: GM Cruise Holdings LLC, San Francisco, CA (US)

(72) Inventors: Thanard Kurutach, Bangkok (TH); Chenyi Chen, Belmont, CA (US); Mircea Grecu, San Mateo, CA (US)

(73) Assignee: GM Cruise Holdings LLC, San Francisco, CA (US)

( * ) Notice: Subject to any disclaimer, the term of this patent is extended or adjusted under 35 U.S.C. 154(b) by 435 days.

(21) Appl. No.: 17/554,149

(22) Filed: Dec. 17, 2021

(51) Int. Cl.
*B60W 30/095* (2012.01)
*B60W 40/04* (2006.01)
*B60W 60/00* (2020.01)
*G06N 20/00* (2019.01)
*G06V 10/70* (2022.01)
*G06V 20/58* (2022.01)

(52) U.S. Cl.
CPC ........ *B60W 30/0956* (2013.01); *B60W 40/04* (2013.01); *B60W 60/0011* (2020.02); *B60W 60/00274* (2020.02); *G06N 20/00* (2019.01); *G06V 10/87* (2022.01); *G06V 20/58* (2022.01)

(58) Field of Classification Search
CPC ......... B60W 30/0956; B60W 60/0011; B60W 60/00274; B60W 40/04; G06N 20/00; G06V 20/58; G06V 10/87
See application file for complete search history.

(56) References Cited

U.S. PATENT DOCUMENTS

| | | | |
|---|---|---|---|
| 10,012,993 B1 | 7/2018 | Matus et al. | |
| 10,026,317 B2 | 7/2018 | Perkins et al. | |
| 11,354,913 B1 * | 6/2022 | Houston | G06F 18/24 |
| 2018/0074501 A1 * | 3/2018 | Boniske | G05D 1/0055 |
| 2019/0146509 A1 * | 5/2019 | Dean | G05D 1/0214 701/25 |
| 2020/0200553 A1 * | 6/2020 | Voznesensky | B60W 40/06 |
| 2020/0346643 A1 | 11/2020 | Woon et al. | |
| 2021/0150722 A1 * | 5/2021 | Homayounfar | G06V 10/7715 |
| 2021/0229656 A1 * | 7/2021 | Dax | G08G 1/096811 |

OTHER PUBLICATIONS

Document containing link and content to "What Are the Chances?: A probabilistic science project from Science Buddies," Science Buddies et al., Scientific American, Oct. 17, 2019 (Year: 2019).*
https://rdw.rowan.edu/cgi/viewcontent.cgi?article=3547&context=etd Plaban Das, Risk analysis of autonomous vehicle and its safety impact on mixed traffic stream, Theses and Dissertations, Apr. 26, 2018, 181 pages, Rowan University/Rowan University Rowan Digital Works Rowan Digital Works, New Jersey.

* cited by examiner

*Primary Examiner* — Anne Marie Antonucci
*Assistant Examiner* — Jared C Bean

(57) ABSTRACT

System, methods, and computer-readable media for an object path prediction model, and an associated training technique, to output a path that is considered an object collision path. The object path prediction model outputs a set of predicted paths for the object that are outputted to a trained planning algorithm, which includes paths that are most likely to occur and a path that is considered an object collision path. The predicted paths are sent to the trained planning algorithm and used for planning a trajectory for the autonomous vehicle that is associated with a low probability of colliding with or taking a sudden evasive action to avoid the object.

17 Claims, 6 Drawing Sheets

OBJECT COLLISION PATH PREDICTION

TECHNICAL FIELD

The subject technology pertains to the training and use of prediction models to output an object collision path of a detected for use by autonomous vehicles.

BACKGROUND

An autonomous vehicle is a motorized vehicle that can navigate without a human driver. An exemplary autonomous vehicle includes a plurality of sensor systems, such as, but not limited to, a camera sensor system, a lidar sensor system, a radar sensor system, amongst others, wherein the autonomous vehicle operates based upon sensor signals output by the sensor systems. Specifically, the sensor signals are provided to an internal computing system in communication with the plurality of sensor systems, wherein a processor executes instructions based upon the sensor signals to control a mechanical system of the autonomous vehicle, such as a vehicle propulsion system, a braking system, or a steering system.

Many autonomous vehicles make decisions based on prediction models that make predictions of paths of surrounding objects. Such prediction models can be improved to deliver a better experience for passengers.

BRIEF DESCRIPTION OF THE DRAWINGS

The above-recited and other advantages and features of the present technology will become apparent by reference to specific implementations illustrated in the appended drawings. A person of ordinary skill in the art will understand that these drawings only show some examples of the present technology and would not limit the scope of the present technology to these examples. Furthermore, the skilled artisan will appreciate the principles of the present technology as described and explained with additional specificity and detail through the use of the accompanying drawings in which.

DETAILED DESCRIPTION

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a more thorough understanding of the subject technology. However, it will be clear and apparent that the subject technology is not limited to the specific details set forth herein and may be practiced without these details. In some instances, structures and components are shown in block diagram form in order to avoid obscuring the concepts of the subject technology.

The disclosed technology addresses the need in the art for an object path prediction model, and an associated training technique, to output a path that is considered an object collision path. Currently, predictions models predict paths that other objects (e.g., a vehicle, a pedestrian, etc.) that are nearby are likely to take—often the path with a probability that surpasses a threshold. However, an unlikely but critical path that would result in in a collision with an autonomous vehicle (AV) may be just as important for the AV to be aware of. As such, the AV will be able to plan a trajectory for the autonomous vehicle that takes into account the low probability of colliding with or taking a sudden evasive action to avoid the object.

Therefore, the present technology provides a training technique that outputs a set of predicted paths for the object to a trained planning algorithm, which includes paths that are most likely to occur and a path that is considered an object collision path. Additionally, the present technology includes training a machine learning algorithm by having the machine learning algorithm evaluate predicted trajectories associated with a probability of being an object collision path and providing a loss value as feedback to indicate whether the predicted trajectory was an object collision path. Training the machine learning algorithm may also include evaluating predicted trajectories associated with a determination of an object collision path being one of the paths that would be outputted to the trained planning algorithm and providing a loss value that provides feedback to indicate whether one of the predicted trajectories is an object collision path.

The training techniques and object path prediction model for an autonomous vehicle of the present technology solves at least these problems and provides other benefits as will be apparent from the figures and description provided herein.

Figure 1:
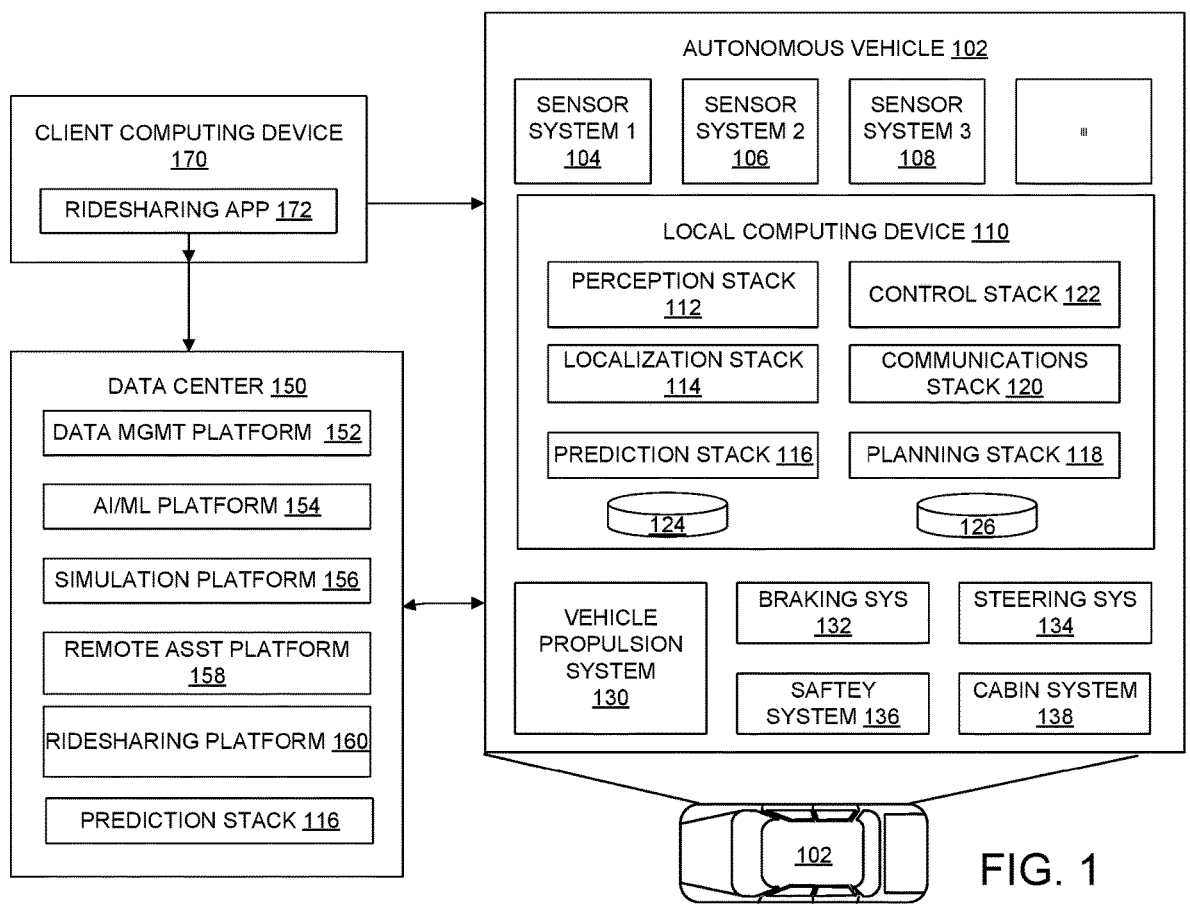
FIG. 1 shows an example embodiment of an autonomous vehicle system and supporting devices in accordance with some aspects of the present technology.

FIG. 1 illustrates an example of an AV management system 100. One of ordinary skill in the art will understand that, for the AV management system 100 and any system discussed in the present disclosure, there can be additional or fewer components in similar or alternative configurations. The illustrations and examples provided in the present disclosure are for conciseness and clarity. Other embodiments may include different numbers and/or types of elements, but one of ordinary skill the art will appreciate that such variations do not depart from the scope of the present disclosure.

In this example, the AV management system 100 includes an AV 102, a data center 150, and a client computing device 170. The AV 102, the data center 150, and the client computing device 170 can communicate with one another over one or more networks (not shown), such as a public network (e.g., the Internet, an Infrastructure as a Service (IaaS) network, a Platform as a Service (PaaS) network, a Software as a Service (SaaS) network, other Cloud Service Provider (CSP) network, etc.), a private network (e.g., a Local Area Network (LAN), a private cloud, a Virtual Private Network (VPN), etc.), and/or a hybrid network (e.g., a multi-cloud or hybrid cloud network, etc.).

The AV 102 can navigate roadways without a human driver based on sensor signals generated by multiple sensor systems 104, 106, and 108. The sensor systems 104-108 can include different types of sensors and can be arranged about the AV 102. For instance, the sensor systems 104-108 can comprise Inertial Measurement Units (IMUs), cameras (e.g., still image cameras, video cameras, etc.), light sensors (e.g., Lighting Detection and Ranging (LIDAR) systems, ambient light sensors, infrared sensors, etc.), Radio Detection and Ranging (RADAR) systems, Global Positioning System (GPS) receivers, audio sensors (e.g., microphones, Sound Navigation and Ranging (SONAR) systems, ultrasonic sensors, etc.), engine sensors, speedometers, tachometers, odometers, altimeters, tilt sensors, impact sensors, airbag sensors, seat occupancy sensors, open/closed door sensors, tire pressure sensors, rain sensors, and so forth. For example, the sensor system 104 can be a camera system, the sensor system 106 can be a LIDAR system, and the sensor system 108 can be a RADAR system. Other embodiments may include any other number and type of sensors.

The AV 102 can also include several mechanical systems that can be used to maneuver or operate the AV 102. For instance, the mechanical systems can include a vehicle propulsion system 130, a braking system 132, a steering system 134, a safety system 136, and a cabin system 138, among other systems. The vehicle propulsion system 130 can include an electric motor, an internal combustion engine, or both. The braking system 132 can include an engine brake, brake pads, actuators, and/or any other suitable componentry configured to assist in decelerating the AV 102. The steering system 134 can include suitable componentry configured to control the direction of movement of the AV 102 during navigation. The safety system 136 can include lights and signal indicators, a parking brake, airbags, and so forth. The cabin system 138 can include cabin temperature control systems, in-cabin entertainment systems, and so forth. In some embodiments, the AV 102 might not include human driver actuators (e.g., steering wheel, handbrake, foot brake pedal, foot accelerator pedal, turn signal lever, window wipers, etc.) for controlling the AV 102. Instead, the cabin system 138 can include one or more client interfaces (e.g., Graphical User Interfaces (GUIs), Voice User Interfaces (VUIs), etc.) for controlling certain aspects of the mechanical systems 130-138.

The AV 102 can additionally include a local computing device 110 that is in communication with the sensor systems 104-108, the mechanical systems 130-138, the data center 150, and the client computing device 170, among other systems. The local computing device 110 can include one or more processors and memory, including instructions that can be executed by the one or more processors. The instructions can make up one or more software stacks or components responsible for controlling the AV 102; communicating with the data center 150, the client computing device 170, and other systems; receiving inputs from riders, passengers, and other entities within the AV's environment; logging metrics collected by the sensor systems 104-108; and so forth. In this example, the local computing device 110 includes a perception stack 112, a mapping and localization stack 114, a prediction stack 116, a planning stack 118, a communications stack 120, a control stack 122, an AV operational database 124, and an HD geospatial database 126, among other stacks and systems.

The perception stack 112 can enable the AV 102 to "see" (e.g., via cameras, LIDAR sensors, infrared sensors, etc.), "hear" (e.g., via microphones, ultrasonic sensors, RADAR, etc.), and "feel" (e.g., pressure sensors, force sensors, impact sensors, etc.) its environment using information from the sensor systems 104-108, the mapping and localization stack 114, the HD geospatial database 126, other components of the AV, and other data sources (e.g., the data center 150, the client computing device 170, third party data sources, etc.). The perception stack 112 can detect and classify objects and determine their current locations, speeds, directions, and the like. In addition, the perception stack 112 can determine the free space around the AV 102 (e.g., to maintain a safe distance from other objects, change lanes, park the AV, etc.). The perception stack 112 can also identify environmental uncertainties, such as where to look for moving objects, flag areas that may be obscured or blocked from view, and so forth. In some embodiments, an output of the prediction stack can be a bounding area around a perceived object that can be associated with a semantic label that identifies the type of object that is within the bounding area, the kinematic of the object (information about its movement), a tracked path of the object, and a description of the pose of the object (its orientation or heading, etc.). The prediction stack 116 may also extend to the data center 150, whereby the various prediction models may be trained at the data center 150.

The mapping and localization stack 114 can determine the AV's position and orientation (pose) using different methods from multiple systems (e.g., GPS, IMUs, cameras, LIDAR, RADAR, ultrasonic sensors, the HD geospatial database, etc.). For example, in some embodiments, the AV 102 can compare sensor data captured in real-time by the sensor systems 104-108 to data in the HD geospatial database 126 to determine its precise (e.g., accurate to the order of a few centimeters or less) position and orientation. The AV 102 can focus its search based on sensor data from one or more first sensor systems (e.g., GPS) by matching sensor data from one or more second sensor systems (e.g., LIDAR). If the mapping and localization information from one system is unavailable, the AV 102 can use mapping and localization information from a redundant system and/or from remote data sources.

The prediction stack 116 can receive information from the localization stack 114 and objects identified by the perception stack 112 and predict a future path for the objects. In some embodiments, the prediction stack 116 can output several likely paths that an object is predicted to take along with a probability associated with each path. For each predicted path, the prediction stack 116 can also output a range of points along the path corresponding to a predicted location of the object along the path at future time intervals along with an expected error value for each of the points that indicates a probabilistic deviation from that point.

The planning stack 118 can determine how to maneuver or operate the AV 102 safely and efficiently in its environment. For example, the planning stack 118 can receive the location, speed, and direction of the AV 102, geospatial data, data regarding objects sharing the road with the AV 102 (e.g., pedestrians, bicycles, vehicles, ambulances, buses, cable cars, trains, traffic lights, lanes, road markings, etc.) or certain events occurring during a trip (e.g., emergency vehicle blaring a siren, intersections, occluded areas, street closures for construction or street repairs, double-parked cars, etc.), traffic rules and other safety standards or practices for the road, user input, and other relevant data for directing the AV 102 from one point to another and outputs from the perception stack 112, localization stack 114, and prediction stack 116. The planning stack 118 can determine multiple sets of one or more mechanical operations that the AV 102 can perform (e.g., go straight at a specified rate of acceleration, including maintaining the same speed or decelerating; turn on the left blinker, decelerate if the AV is above a threshold range for turning, and turn left; turn on the right blinker, accelerate if the AV is stopped or below the threshold range for turning, and turn right; decelerate until completely stopped and reverse; etc.), and select the best one to meet changing road conditions and events. If something unexpected happens, the planning stack 118 can select from multiple backup plans to carry out. For example, while preparing to change lanes to turn right at an intersection, another vehicle may aggressively cut into the destination lane, making the lane change unsafe. The planning stack 118 could have already determined an alternative plan for such an event. Upon its occurrence, it could help direct the AV 102 to go around the block instead of blocking a current lane while waiting for an opening to change lanes.

The control stack 122 can manage the operation of the vehicle propulsion system 130, the braking system 132, the steering system 134, the safety system 136, and the cabin system 138. The control stack 122 can receive sensor signals from the sensor systems 104-108 as well as communicate with other stacks or components of the local computing device 110 or a remote system (e.g., the data center 150) to effectuate operation of the AV 102. For example, the control stack 122 can implement the final path or actions from the multiple paths or actions provided by the planning stack 118. This can involve turning the routes and decisions from the planning stack 118 into commands for the actuators that control the AV's steering, throttle, brake, and drive unit.

The communication stack 120 can transmit and receive signals between the various stacks and other components of the AV 102 and between the AV 102, the data center 150, the client computing device 170, and other remote systems. The communication stack 120 can enable the local computing device 110 to exchange information remotely over a network, such as through an antenna array or interface that can provide a metropolitan WIFI network connection, a mobile or cellular network connection (e.g., Third Generation (3G), Fourth Generation (4G), Long-Term Evolution (LTE), 5th Generation (5G), etc.), and/or other wireless network connection (e.g., License Assisted Access (LAA), Citizens Broadband Radio Service (CBRS), MULTEFIRE, etc.). The communication stack 120 can also facilitate the local exchange of information, such as through a wired connection (e.g., a user's mobile computing device docked in an in-car docking station or connected via Universal Serial Bus (USB), etc.) or a local wireless connection (e.g., Wireless Local Area Network (WLAN), Bluetooth®, infrared, etc.).

The HD geospatial database 126 can store HD maps and related data of the streets upon which the AV 102 travels. In some embodiments, the HD maps and related data can comprise multiple layers, such as an areas layer, a lanes and boundaries layer, an intersections layer, a traffic controls layer, and so forth. The areas layer can include geospatial information indicating geographic areas that are drivable (e.g., roads, parking areas, shoulders, etc.) or not drivable (e.g., medians, sidewalks, buildings, etc.), drivable areas that constitute links or connections (e.g., drivable areas that form the same road) versus intersections (e.g., drivable areas where two or more roads intersect), and so on. The lanes and boundaries layer can include geospatial information of road lanes (e.g., lane centerline, lane boundaries, type of lane boundaries, etc.) and related attributes (e.g., direction of travel, speed limit, lane type, etc.). The lanes and boundaries layer can also include 3D attributes related to lanes (e.g., slope, elevation, curvature, etc.). The intersections layer can include geospatial information of intersections (e.g., crosswalks, stop lines, turning lane centerlines and/or boundaries, etc.) and related attributes (e.g., permissive, protected/permissive, or protected only left turn lanes; legal or illegal u-turn lanes; permissive or protected only right turn lanes; etc.). The traffic controls lane can include geospatial information of traffic signal lights, traffic signs, and other road objects and related attributes.

The AV operational database 124 can store raw AV data generated by the sensor systems 104-108, stacks 112-122, and other components of the AV 102 and/or data received by the AV 102 from remote systems (e.g., the data center 150, the client computing device 170, etc.). In some embodiments, the raw AV data can include HD LIDAR point cloud data, image data, RADAR data, GPS data, and other sensor data that the data center 150 can use for creating or updating AV geospatial data or for creating simulations of situations encountered by AV 102 for future testing or training of various machine learning algorithms that are incorporated in the local computing device 110.

The data center 150 can be a private cloud (e.g., an enterprise network, a co-location provider network, etc.), a public cloud (e.g., an Infrastructure as a Service (IaaS) network, a Platform as a Service (PaaS) network, a Software as a Service (SaaS) network, or other Cloud Service Provider (CSP) network), a hybrid cloud, a multi-cloud, and so forth. The data center 150 can include one or more computing devices remote to the local computing device 110 for managing a fleet of AVs and AV-related services. For example, in addition to managing the AV 102, the data center 150 may also support a ridesharing service, a delivery service, a remote/roadside assistance service, street services (e.g., street mapping, street patrol, street cleaning, street metering, parking reservation, etc.), and the like.

The data center 150 can send and receive various signals to and from the AV 102 and the client computing device 170. These signals can include sensor data captured by the sensor systems 104-108, roadside assistance requests, software updates, ridesharing pick-up and drop-off instructions, and so forth. In this example, the data center 150 includes a data management platform 152, an Artificial Intelligence/Machine Learning (AI/ML) platform 154, a simulation platform 156, a remote assistance platform 158, and a ridesharing platform 160, among other systems.

The data management platform 152 can be a "big data" system capable of receiving and transmitting data at high velocities (e.g., near real-time or real-time), processing a large variety of data and storing large volumes of data (e.g., terabytes, petabytes, or more of data). The varieties of data can include data having different structured (e.g., structured, semi-structured, unstructured, etc.), data of different types (e.g., sensor data, mechanical system data, ridesharing service, map data, audio, video, etc.), data associated with different types of data stores (e.g., relational databases, key-value stores, document databases, graph databases, column-family databases, data analytic stores, search engine databases, time series databases, object stores, file systems, etc.), data originating from different sources (e.g., AVs, enterprise systems, social networks, etc.), data having different rates of change (e.g., batch, streaming, etc.), or data having other heterogeneous characteristics. The various platforms and systems of the data center 150 can access data stored by the data management platform 152 to provide their respective services.

The AI/ML platform 154 can provide the infrastructure for training and evaluating machine learning algorithms for operating the AV 102, the simulation platform 156, the remote assistance platform 158, the ridesharing platform 160, the cartography platform 162, and other platforms and systems. Using the AI/ML platform 154, data scientists can prepare data sets from the data management platform 152;

select, design, and train machine learning models; evaluate, refine, and deploy the models; maintain, monitor, and retrain the models; and so on.

The simulation platform 156 can enable testing and validation of the algorithms, machine learning models, neural networks, and other development efforts for the AV 102, the remote assistance platform 158, the ridesharing platform 160, the cartography platform 162, and other platforms and systems. The simulation platform 156 can replicate a variety of driving environments and/or reproduce real-world scenarios from data captured by the AV 102, including rendering geospatial information and road infrastructure (e.g., streets, lanes, crosswalks, traffic lights, stop signs, etc.) obtained from the cartography platform 162; modeling the behavior of other vehicles, bicycles, pedestrians, and other dynamic elements; simulating inclement weather conditions, different traffic scenarios; and so on.

The remote assistance platform 158 can generate and transmit instructions regarding the operation of the AV 102. For example, in response to an output of the AI/ML platform 154 or other system of the data center 150, the remote assistance platform 158 can prepare instructions for one or more stacks or other components of the AV 102.

The ridesharing platform 160 can interact with a customer of a ridesharing service via a ridesharing application 172 executing on the client computing device 170. The client computing device 170 can be any type of computing system, including a server, desktop computer, laptop, tablet, smartphone, smart wearable device (e.g., smartwatch, smart eyeglasses or other Head-Mounted Display (HMD), smart ear pods, or other smart in-ear, on-ear, or over-ear device, etc.), gaming system, or other general purpose computing device for accessing the ridesharing application 172. The client computing device 170 can be a customer's mobile computing device or a computing device integrated with the AV 102 (e.g., the local computing device 110). The ridesharing platform 160 can receive requests to pick up or drop off from the ridesharing application 172 and dispatch the AV 102 for the trip.

Figure 2:
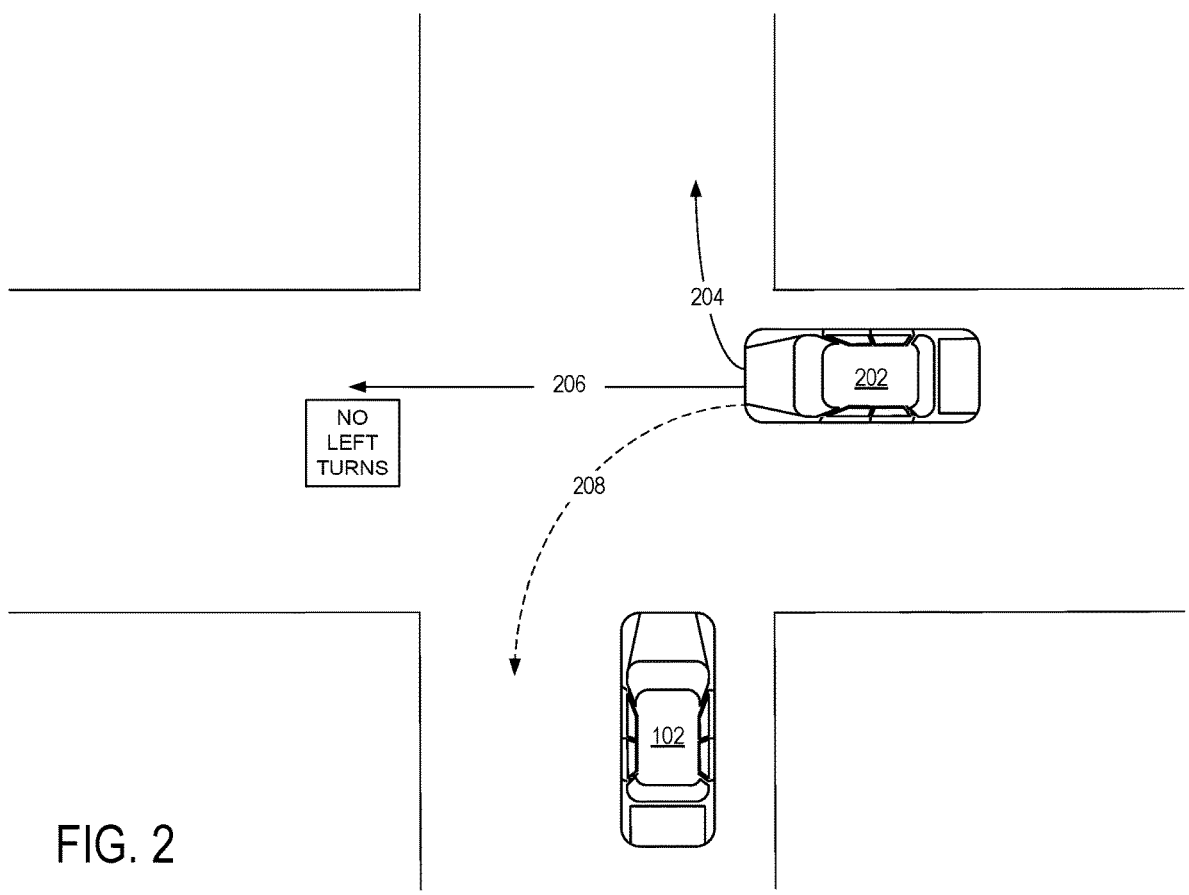
FIG. 2 shows an example environment, in which an autonomous vehicle detects a nearby vehicle, in accordance with some aspects of the present technology.

FIG. 2 illustrates an example environment for the autonomous vehicle, in which a detected object is nearby and a future path of the detected object is determined, in accordance with some aspects of the present technology.

In FIG. 2, the detected object is a vehicle 202, for which an object path prediction model of the prediction stack 116 would be predicting a path. More specifically, the vehicle 202 may be orthogonal to the AV 102 at an intersection. In predicting the path, the object path prediction model may first determine a set of possible future paths that the vehicle 202 may take, the probability that the vehicle 202 may take any of the predicted paths, a set of points along each of the predicted paths, and/or a predicted uncertainty associated with each of the points.

With respect to paths that are most likely to occur, in the example illustrated in FIG. 2, a first path 204 and a second path 206 may be the two most likely paths for the vehicle 202, if for example, the vehicle 202 is not allowed to make a left turn at that intersection. If the planning stack 119 were to only receive these two paths for planning a trajectory for the AV 102, a low possibility but high-risk path, such as an object collision path 208 that would result in a collision with the AV 102 may not considered. Therefore, meeting a threshold for possibility should not be the only parameter for determining paths that outputted to the planning stack 118. The object collision path 208 should also be included as an output of the object path prediction model.

Figure 3:
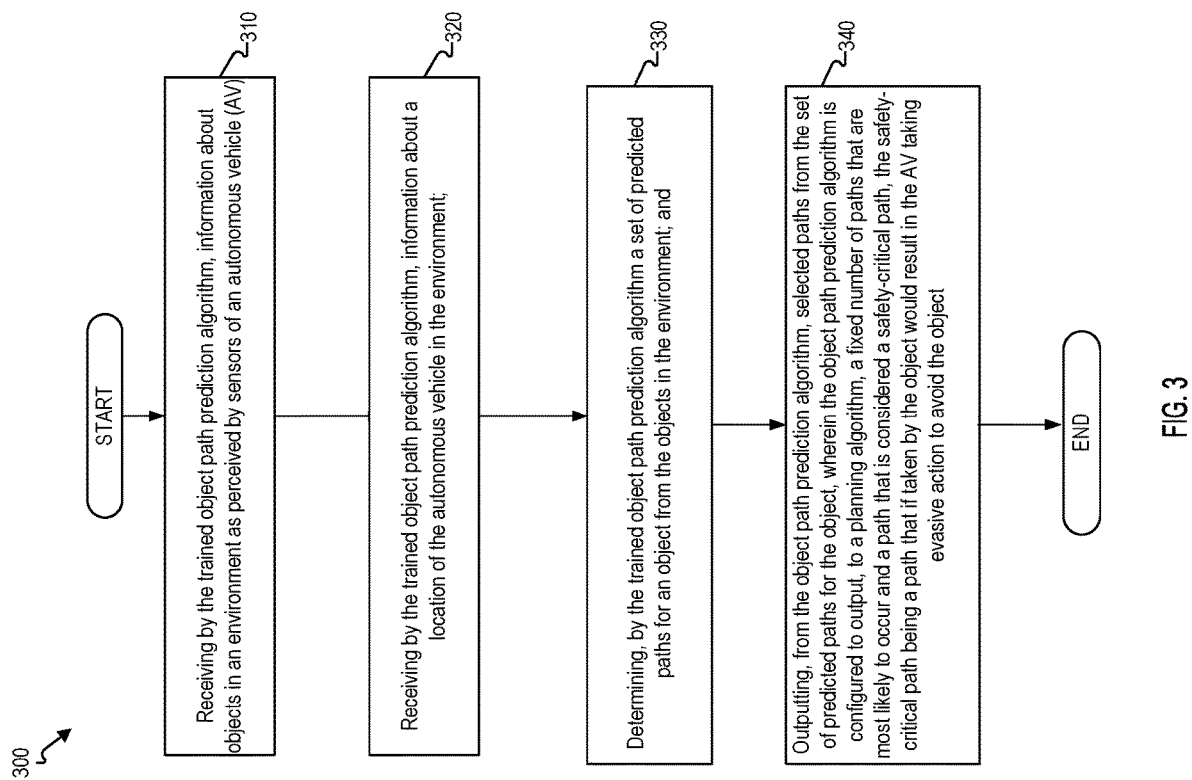
FIG. 3 shows an example flow diagram for identifying an object collision path from a trained object path prediction algorithm in accordance with some aspects of the present technology.

FIG. 3 illustrates an example method 300 for identifying an object collision 1 path from a trained object path prediction algorithm. Although the example method 300 depicts a particular sequence of operations, the sequence may be altered without departing from the scope of the present disclosure. For example, some of the operations depicted may be performed in parallel or in a different sequence that does not materially affect the function of the method 300. In other examples, different components of an example device or system that implements the method 300 may perform functions at substantially the same time or in a specific sequence.

According to some aspects, the method includes receiving, by an object path prediction algorithm, information about objects in an environment as perceived by sensors of an autonomous vehicle (AV) at step 310. For example, the object path prediction algorithm of the prediction stack 116 illustrated in FIG. 1 may receive, by an object path prediction algorithm, information about objects in an environment as perceived by sensors of an autonomous vehicle (AV).

According to some aspects, the method includes receiving, by the object path prediction algorithm, information about a location of the autonomous vehicle in the environment at step 320. For example, the object path prediction algorithm of the prediction stack 116 illustrated in FIG. 1 may receive information about the location of the autonomous vehicle in the environment.

According to some aspects, the method includes determining, by the object path prediction algorithm, a set of predicted paths for an object from the objects in the environment at step 330. For example, the object path prediction algorithm of the prediction stack 116 illustrated in FIG. 1 may determine the set of predicted paths for the object from the objects in the environment.

According to some aspects, the method includes outputting, from the object path prediction algorithm, selected paths from the set of predicted paths for the object at step 340. For example, the object path prediction algorithm of the prediction stack 116 illustrated in FIG. 1 may output selected paths from the set of predicted paths for the object. In some aspects, the object path prediction algorithm is configured to output, to a planning algorithm, a fixed number of paths that are most likely to occur and a path that is considered an object collision path, the object collision path being a path that if taken by the object would result in the AV taking evasive action to avoid the object.

In some aspects, the object path prediction algorithm is a multimodal machine-learning prediction algorithm with a dedicated object collision head, and the method comprises outputting, via the dedicated object collision head, the object collision path. For example, the object path prediction algorithm of the prediction stack 116 illustrated in FIG. 1 may output, via the dedicated object collision head, the object collision path.

In some aspects, the multimodal machine-learning prediction algorithm further comprises a multi-class classification head, and the method comprises outputting, via the multi-class classification head, probabilities associated with each mode of the multimodal machine-learning prediction algorithm. For example, the object path prediction algorithm of the prediction stack 116 illustrated in FIG. 1 may output, via the multi-class classification head, probabilities associated with each mode of the multimodal machine-learning prediction algorithm. In some aspects, the probabilities have a sum of 1.

In some aspects, the multimodal machine-learning prediction algorithm further comprises a binary classification head, and the method comprises outputting, via the binary classification head, a binary label characterizing whether the object collision path is relevant or not to the planning algorithm. For example, the object path prediction algorithm of the prediction stack 116 illustrated in FIG. 1 may output, via the binary classification head, a binary label characterizing whether the object collision path is relevant or not to the planning algorithm. In some aspects, the planning algorithm uses the binary classification output to calibrate the relevancy of the object collision path.

According to some aspects, the method includes sending the selected paths, including the object collision path, to the planning algorithm for use in planning a trajectory for the autonomous vehicle that is associated with a low probability of colliding with or taking a sudden evasive action to avoid the object at step 350. For example, the prediction stack 116 illustrated in FIG. 1 may send the selected paths, including the object collision path, to the planning algorithm for use in planning a trajectory for the autonomous vehicle that is associated with a low probability of colliding with or taking a sudden evasive action to avoid the object. In some aspects, the subsequent trajectories are labeled to identify when a path traveled by the object was an object collision path. In some aspects, the object path prediction algorithm is trained by being provided a labeled dataset including the information about the objects in the environment as perceived by the sensors of the autonomous vehicle, and subsequent trajectories observed to be traveled by the objects in the environment. In some aspects, the labeled dataset is at least partially derived from road event data collected by the autonomous vehicle that includes a flag to indicate that an autonomous vehicle technical operator has taken over control of the autonomous vehicle, and the labeled dataset has labels to identify when the path traveled by the object was the object collision path.

Figure 4:
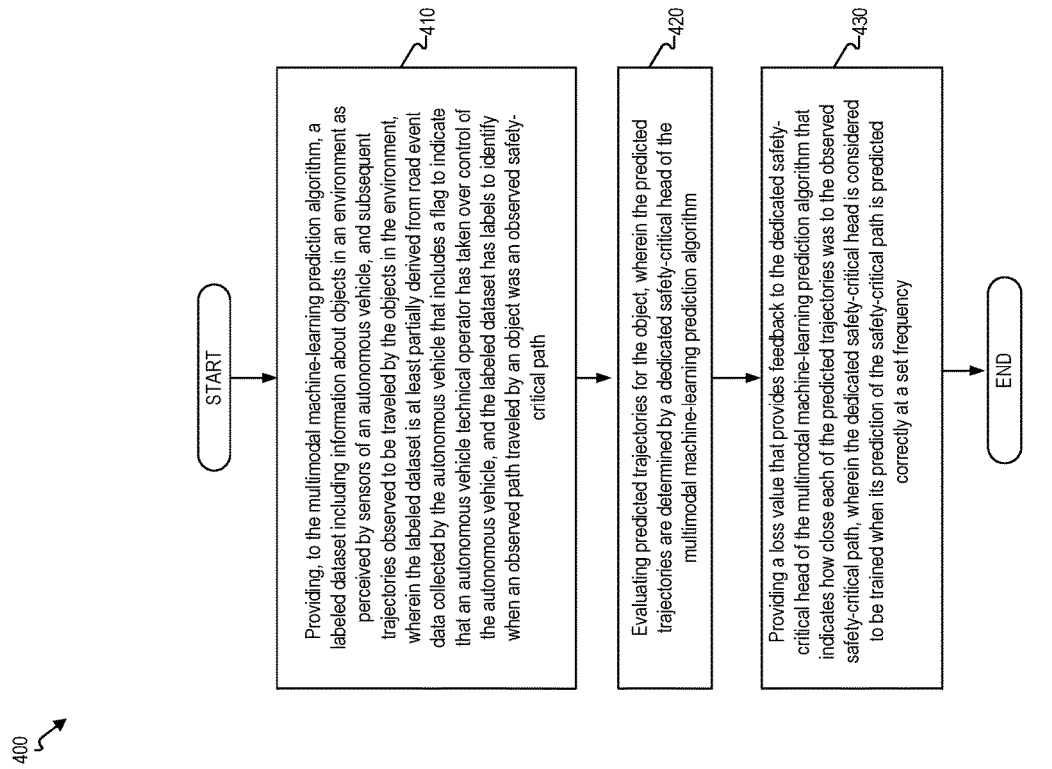
FIG. 4 shows an example flow diagram of training a machine learning algorithm to determine object collision paths in accordance with some aspects of the present technology.

FIG. 4 illustrates an example method 40) for training a machine-learning algorithm to determine object collision paths. Although the example method 400 depicts a particular sequence of operations, the sequence may be altered without departing from the scope of the present disclosure. For example, some of the operations depicted may be performed in parallel or in a different sequence that does not materially affect the function of the method 400. In other examples, different components of an example device or system that implements the method 400 may preform functions at substantially the same time or in a specific sequence.

According to some aspects, the method includes providing, to the multimodal machine-learning prediction algorithm, a labeled dataset including information about objects in an environment as perceived by sensors of an autonomous vehicle, and subsequent trajectories observed to be traveled by the objects in the environment at step 410. For example, the AI/MI platform 152 illustrated in FIG. 1 may provide, to the multimodal machine-learning prediction algorithm, a labeled dataset including information about objects in an environment as perceived by sensors of an autonomous vehicle, and subsequent trajectories observed to be traveled by the objects in the environment. In some aspects, the labeled dataset is at least partially derived from road event data collected by the autonomous vehicle that includes a flag to indicate that an autonomous vehicle technical operator has taken over control of the autonomous vehicle, and the labeled dataset has labels to identify when an observed path traveled by an object was an observed object collision path.

According to some aspects, the method includes evaluating predicted trajectories for the object at step 420. For example, the AI/ML platform 152 illustrated in FIG. 1 may evaluate predicted trajectories for the object. In some aspects, the predicted trajectories are determined by a dedicated object collision head of the multimodal machine-learning prediction algorithm.

According to some aspects, the method includes providing a loss value that provides feedback to the dedicated object collision head of the multimodal machine-learning prediction algorithm that indicates how close each of the predicted trajectories was to the observed object collision path at step 430. For example, the AI/ML platform 152 illustrated in FIG. 1 may provide a loss value that provides feedback to the dedicated object collision head of the multimodal machine-learning prediction algorithm that indicates how close each of the predicted trajectories was to the observed object collision path.

Figure 5:
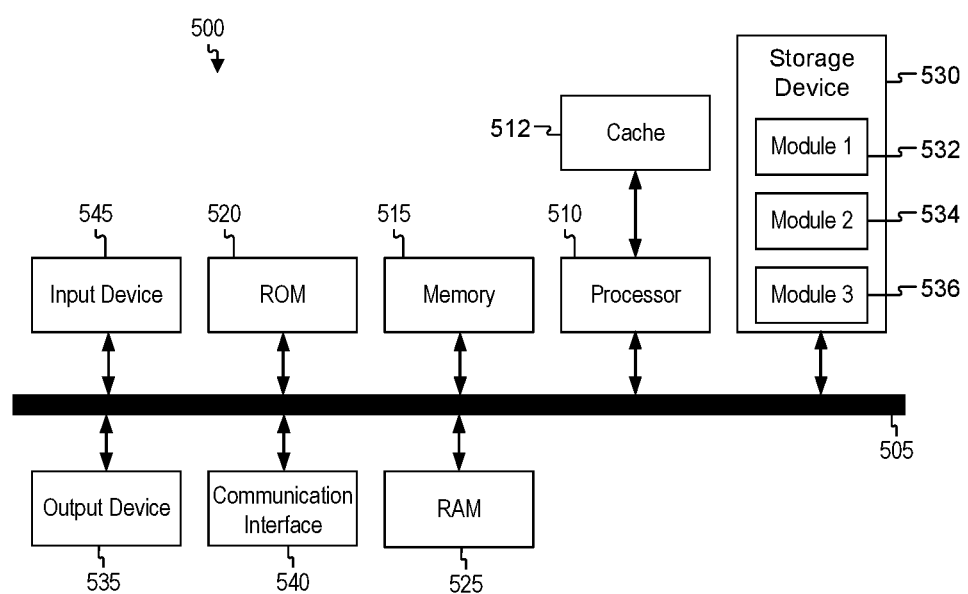
FIG. 5 shows an example system for implementing certain aspects of the present technology.

FIG. 5 shows an example of computing system 500, which can be for example any computing device making up the local computer device 110 and the data center 150, or any component thereof in which the components of the system are in communication with each other using connection 505. Connection 505 can be a physical connection via a bus, or a direct connection into processor 510, such as in a chipset architecture. Connection 505 can also be a virtual connection, networked connection, or logical connection.

In some embodiments, computing system 500 is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

Example system 500 includes at least one processing unit (CPU or processor) 510 and connection 505 that couples various system components including system memory 515, such as read-only memory (ROM) 520 and random access memory (RAM) 525 to processor 510. Computing system 500 can include a cache of high-speed memory 512 connected directly with, in close proximity to, or integrated as part of processor 510.

Processor 510 can include any general purpose processor and a hardware service or software service, such as services 532, 534, and 536 stored in storage device 530, configured to control processor 510 as well as a special-purpose processor where software instructions are incorporated into the actual processor design. Processor 510 may essentially be a completely self-contained computing system, containing multiple cores or processors, a bus, memory controller, cache, etc. A multi-core processor may be symmetric or asymmetric.

To enable user interaction, computing system 500 includes an input device 545, which can represent any number of input mechanisms, such as a microphone for speech, a touch-sensitive screen for gesture or graphical input, keyboard, mouse, motion input, speech, etc. Computing system 500 can also include output device 535, which can be one or more of a number of output mechanisms known to those of skill in the art. In some instances, multimodal systems can enable a user to provide multiple types of input/output to communicate with computing system 500. Computing system 500 can include communications interface 540, which can generally govern and manage the user input and system output. There is no restriction on operating on any particular hardware arrangement, and therefore the basic features here may easily be substituted for improved hardware or firmware arrangements as they are developed.

Storage device 530 can be a non-volatile memory device and can be a hard disk or other types of computer readable media which can store data that are accessible by a computer, such as magnetic cassettes, flash memory cards, solid state memory devices, digital versatile disks, cartridges, random access memories (RAMs), read-only memory (ROM), and/or some combination of these devices.

The storage device 530 can include software services, servers, services, etc., that when the code that defines such software is executed by the processor 510, it causes the system to perform a function. In some embodiments, a hardware service that performs a particular function can include the software component stored in a computer-readable medium in connection with the necessary hardware components, such as processor 510, connection 505, output device 535, etc., to carry out the function.

For clarity of explanation, in some instances, the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program or a collection of programs that carry out a specific function. In some embodiments, a service can be considered a server. The memory can be a non-transitory computer-readable medium.

In some embodiments, the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer-readable media. Such instructions can comprise, for example, instructions and data which cause or otherwise configure a general purpose computer, special purpose computer, or special purpose processing device to perform a certain function or group of functions. Portions of computer resources used can be accessible over a network. The executable computer instructions may be, for example, binaries, intermediate format instructions such as assembly language, firmware, or source code. Examples of computer-readable media that may be used to store instructions, information used, and/or information created during methods according to described examples include magnetic or optical disks, solid-state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smartphones, small form factor personal computers, personal digital assistants, and so on. The functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Figure 6:
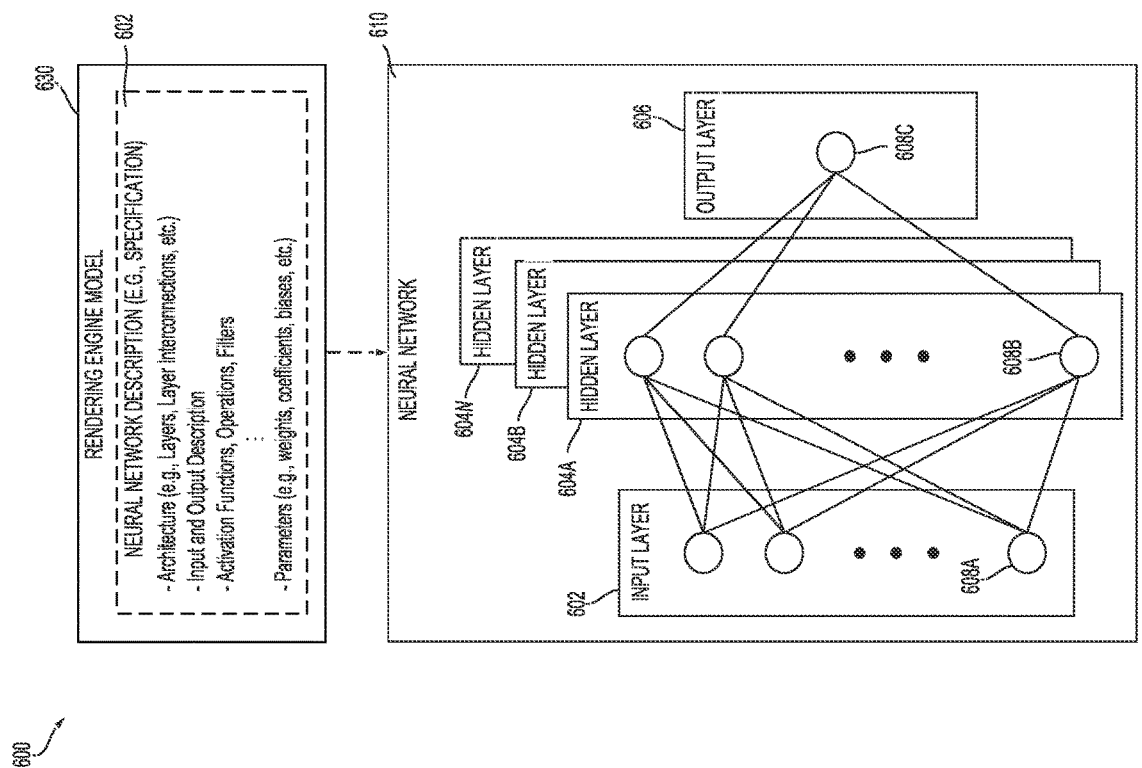
FIG. 6 illustrates an example neural network architecture in accordance with some aspects of the present technology.

FIG. 6 illustrates an example neural network architecture, in accordance with some aspects of the present technology. Architecture 600 includes a neural network 610 defined by an example neural network description 601 in rendering engine model (neural controller) 630. The neural network 610 can represent a neural network implementation of a rendering engine for rendering media data. The neural network description 601 can include a full specification of the neural network 610, including the neural network architecture 600. For example, the neural network description 601 can include a description or specification of the architecture 600 of the neural network 610 (e.g., the layers, layer interconnections, number of nodes in each layer, etc.); an input and output description which indicates how the input and output are formed or processed; an indication of the activation functions in the neural network, the operations or filters in the neural network, etc.; neural network parameters such as weights, biases, etc.; and so forth.

The neural network 610 reflects the architecture 600 defined in the neural network description 601. In this example, the neural network 610 includes an input layer 602, which includes input data, information about objects (e.g., vehicle 202) in an environment as perceived by sensors 104, 106, 108 of the AV 102. In one illustrative example, the input layer 602 can include data representing a portion of the input media data such as a patch of data or pixels (e.g., a 128×128 patch of data) in an image corresponding to the input media data (e.g., that of vehicle 202 and the environment).

The neural network 610 includes hidden layers 604A through 604N (collectively "604" hereinafter). The hidden layers 604 can include n number of hidden layers, where n is an integer greater than or equal to one. The number of hidden layers can include as many layers as needed for a desired processing outcome and/or rendering intent. The neural network 610 further includes an output layer 606 that provides an output (e.g., paths that are outputted to a trained planning algorithm) resulting from the processing performed by the hidden layers 604. In one illustrative example, the output layer 606 can provide paths that are most likely to occur and a path that is considered an object collision path.

The neural network 610 in this example is a multi-layer neural network of interconnected nodes. Each node can represent a piece of information. Information associated with the nodes is shared among the different layers and each layer retains information as information is processed. In some cases, the neural network 610 can include a feed-forward neural network, in which case there are no feedback connections where outputs of the neural network are fed back into itself. In other cases, the neural network 610 can include a recurrent neural network, which can have loops that allow information to be carried across nodes while reading in input.

Information can be exchanged between nodes through node-to-node interconnections between the various layers. Nodes of the input layer 602 can activate a set of nodes in the first hidden layer 604A. For example, as shown, each of the input nodes of the input layer 602 is connected to each of the nodes of the first hidden layer 604A. The nodes of the hidden layer 604A can transform the information of each input node by applying activation functions to the information. The information derived from the transformation can then be passed to and can activate the nodes of the next hidden layer (e.g., 604B), which can perform their own designated functions. Example functions include convolutional, up-sampling, data transformation, pooling, and/or any other suitable functions. The output of the hidden layer (e.g., 604B) can then activate nodes of the next hidden layer (e.g., 604N), and so on. The output of the last hidden layer can activate one or more nodes of the output layer 606, at which point an output is provided. In some cases, while nodes (e.g., nodes 608A, 608B, 608C) in the neural network 610 are shown as having multiple output lines, a node has a single output and all lines shown as being output from a node represent the same output value.

In some cases, each node or interconnection between nodes can have a weight that is a set of parameters derived from training the neural network 610. For example, an interconnection between nodes can represent a piece of information learned about the interconnected nodes. The interconnection can have a numeric weight that can be tuned (e.g., based on a training dataset), allowing the neural network 610 to be adaptive to inputs and able to learn as more data is processed.

The neural network 610 can be pre-trained to process the features from the data in the input layer 602 using the different hidden layers 604 in order to provide the output through the output layer 606. In an example in which the neural network 610 is used to identify an object collision path from a trained object path prediction algorithm, the neural network 610 can be trained using training data that includes example objects (e.g., vehicle 202) in an environment as perceived by sensors 104-108 of the AV 102. For instance, training images can be input into the neural network 610, which can be processed by the neural network 610 to generate outputs which can be used to tune one or more aspects of the neural network 610, such as weights, biases, etc.

In some cases, the neural network 610 can adjust weights of nodes using a training process called backpropagation. Backpropagation can include a forward pass, a loss function, a backward pass, and a weight update. The forward pass, loss function, backward pass, and parameter update is performed for one training iteration. The process can be repeated for a certain number of iterations for each set of training media data until the weights of the layers are accurately tuned.

For a first training iteration for the neural network 610, the output can include values that do not give preference to any particular class due to the weights being randomly selected at initialization. For example, if the output is a vector with probabilities that the object includes different product(s) and/or different users, the probability value for each of the different product and/or user may be equal or at least very similar (e.g., for ten possible products or users, each class may have a probability value of 0.1). With the initial weights, the neural network 610 is unable to determine low level features and thus cannot make an accurate determination of what the classification of the object might be. A loss function can be used to analyze errors in the output. Any suitable loss function definition can be used.

The loss (or error) can be high for the first training dataset (e.g., images) since the actual values will be different than the predicted output. The goal of training is to minimize the amount of loss so that the predicted output comports with a target or ideal output. The neural network 610 can perform a backward pass by determining which inputs (weights) most contributed to the loss of the neural network 610, and can adjust the weights so that the loss decreases and is eventually minimized.

A derivative of the loss with respect to the weights can be computed to determine the weights that contributed most to the loss of the neural network 610. After the derivative is computed, a weight update can be performed by updating the weights of the filters. For example, the weights can be updated so that they change in the opposite direction of the gradient. A learning rate can be set to any suitable value, with a high learning rate including larger weight updates and a lower value indicating smaller weight updates.

The neural network 610 can include any suitable neural or deep learning network. One example includes a convolutional neural network (CNN), which includes an input layer and an output layer, with multiple hidden layers between the input and out layers. The hidden layers of a CNN include a series of convolutional, nonlinear, pooling (for downsampling), and fully connected layers. In other examples, the neural network 610 can represent any other neural or deep learning network, such as an autoencoder, a deep belief nets (DBNs), a recurrent neural networks (RNNs), etc.

Illustrative Examples of the Disclosure Include:

Aspect 1: A method for identifying an object collision path, the method comprising: receiving, by an object path prediction algorithm, information about objects in an environment as perceived by sensors of an autonomous vehicle (AV); receiving, by the object path prediction algorithm, information about a location of the autonomous vehicle in the environment; determining, by the object path prediction algorithm, a set of predicted paths for an object from the objects in the environment; and outputting, from the object path prediction algorithm, selected paths from the set of predicted paths for the object, wherein the object path prediction algorithm is configured to output, to a planning algorithm, a fixed number of paths that are most likely to occur and a path that is considered an object collision path, the object collision path being a path that if taken by the object would result in the AV taking evasive action to avoid the object.

Aspect 2: The method of Aspect 1, wherein the object path prediction algorithm is a multimodal machine-learning prediction algorithm with a dedicated object collision head, the method further comprising: outputting, via the dedicated object collision head, the object collision path.

Aspect 3: The method of any of Aspects 1 to 2, wherein the multimodal machine-learning prediction algorithm further comprises a multi-class classification head, the method further comprising: outputting, via the multi-class classification head, probabilities associated with each mode of the multimodal machine-learning prediction algorithm, wherein the probabilities have a sum of 1.

Aspect 4: The method of any of Aspects 1 to 3, wherein the multimodal machine-learning prediction algorithm further comprises a binary classification head, the method further comprising: outputting, via the binary classification head, a binary label characterizing whether the object collision path is relevant or not to the planning algorithm.

Aspect 5: The method of any of Aspects 1 to 4, wherein the planning algorithm uses the binary classification output to calibrate the relevancy of the object collision path.

Aspect 6: The method of any of Aspects 1 to 5, further comprising: sending the selected paths, including the object collision path, to the planning algorithm for use in planning a trajectory for the autonomous vehicle that is associated with a low probability of colliding with or taking a sudden evasive action to avoid the object.

Aspect 7: The method of any of Aspects 1 to 6, wherein the object path prediction algorithm is trained by being provided a labeled dataset including the information about the objects in the environment as perceived by the sensors of the autonomous vehicle, and subsequent trajectories observed to be traveled by the objects in the environment, wherein the subsequent trajectories are labeled to identify when a path traveled by the object was an object collision path.

Aspect 8: The method of any of Aspects 1 to 7, wherein the labeled dataset is at least partially derived from road event data collected by the autonomous vehicle that includes a flag to indicate that an autonomous vehicle technical operator has taken over control of the autonomous vehicle, and the labeled dataset has labels to identify when the path traveled by the object was the object collision path.

Aspect 9: A method for training a multimodal machine-learning prediction algorithm to identify an object collision path: providing, to the multimodal machine-learning prediction algorithm, a labeled dataset including information about objects in an environment as perceived by sensors of an autonomous vehicle, and subsequent trajectories observed to be traveled by the objects in the environment, wherein the labeled dataset is at least partially derived from road event data collected by the autonomous vehicle that includes a flag to indicate that an autonomous vehicle technical operator has taken over control of the autonomous vehicle, and the labeled dataset has labels to identify when an observed path traveled by an object was an observed object collision path; evaluating predicted trajectories for the object, wherein the predicted trajectories are determined by a dedicated object collision head of the multimodal machine-learning prediction algorithm; and providing a loss value that provides feedback to the dedicated object collision head of the multimodal machine-learning prediction algorithm that indicates how close each of the predicted trajectories was to the observed object collision path, Aspect 10: A system for identifying an object collision path from a trained object path prediction algorithm, comprising: a storage configured to store instructions; a processor configured to execute the instructions and cause the processor to: receive, by an object path prediction algorithm, information about objects in an environment as perceived by sensors of an autonomous vehicle (AV), receive, by the object path prediction algorithm, information about a location of the autonomous vehicle in the environment, determine, by the object path prediction algorithm, a set of predicted paths for an object from the objects in the environment, output, from the object path prediction algorithm, selected paths from the set of predicted paths for the object, and the object path prediction algorithm is configured to output, to a planning algorithm, a fixed number of paths that are most likely to occur and a path that is considered an object collision path, the object collision path being a path that if taken by the object would result in the AV taking evasive action to avoid the object.

Aspect 11: The system of Aspect 10, wherein the processor is configured to execute the instructions and cause the processor to: output, via the dedicated object collision head, the object collision path.

Aspect 12: The system of any of Aspects 10 to 11, wherein the processor is configured to execute the instructions and cause the processor to: output, via the multi-class classification head, probabilities associated with each mode of the multimodal machine-learning prediction algorithm, wherein the probabilities have a sum of 1.

Aspect 13: The system of any of Aspects 10 to 12, wherein the processor is configured to execute the instructions and cause the processor to: output, via the binary classification head, a binary label characterizing whether the object collision path is relevant or not to the planning algorithm.

Aspect 14: The system of any of Aspects 10 to 13, wherein the planning algorithm uses the binary classification output to calibrate the relevancy of the object collision path.

Aspect 15: The system of any of Aspects 10 to 14, wherein the processor is configured to execute the instructions and cause the processor to: send the selected paths, including the object collision path, to the planning algorithm for use in planning a trajectory for the autonomous vehicle that is associated with a low probability of colliding with or taking a sudden evasive action to avoid the object.

Aspect 16: The system of any of Aspects 10 to 15, wherein the object path prediction algorithm is trained by being provided a labeled dataset including the information about the objects in the environment as perceived by the sensors of the autonomous vehicle, and subsequent trajectories observed to be traveled by the objects in the environment and the object path prediction algorithm is trained by being provided a labeled dataset including the information about the objects in the environment as perceived by the sensors of the autonomous vehicle, and subsequent trajectories observed to be traveled by the objects in the environment.

Aspect 17: The system of any of Aspects 10 to 16, wherein the labeled dataset is at least partially derived from road event data collected by the autonomous vehicle that includes a flag to indicate that an autonomous vehicle technical operator has taken over control of the autonomous vehicle, and the labeled dataset has labels to identify when the path traveled by the object was the object collision path.

Aspect 18: A non-transitory computer-readable medium comprising instructions, the instructions, when executed by a computing system, cause the computing system to: receive, by an object path prediction algorithm, information about objects in an environment as perceived by sensors of an autonomous vehicle (AV); receive, by the object path prediction algorithm, information about a location of the autonomous vehicle in the environment; determine, by the object path prediction algorithm, a set of predicted paths for an object from the objects in the environment; output, from the object path prediction algorithm, selected paths from the set of predicted paths for the object; and the object path prediction algorithm is configured to output, to a planning algorithm, a fixed number of paths that are most likely to occur and a path that is considered an object collision path, the object collision path being a path that if taken by the object would result in the AV taking evasive action to avoid the object.

Aspect 19: The non-transitory computer-readable medium of Aspect 18, wherein the non-transitory computer-readable medium further comprises instructions that, when executed by the computing system, cause the computing system to: output, via the dedicated object collision head, the object collision path.

Aspect 20: The non-transitory computer-readable medium of any of Aspects 18 to 19, wherein the non-transitory computer-readable medium further comprises instructions that, when executed by the computing system, cause the computing system to: output, via the multi-class classification head, probabilities associated with each mode of the multimodal machine-learning prediction algorithm, wherein the probabilities have a sum of 1.

Aspect 21: The non-transitory computer-readable medium of any of Aspects 18 to 20, wherein the non-transitory computer-readable medium further comprises instructions that, when executed by the computing system, cause the computing system to: output, via the binary classification head, a binary label characterizing whether the object collision path is relevant or not to the planning algorithm.

Aspect 22: The non-transitory computer-readable medium of any of Aspects 18 to 21, the planning algorithm uses the binary classification output to calibrate the relevancy of the object collision path.

Aspect 23: The non-transitory computer-readable medium of any of Aspects 18 to 22, wherein the non-transitory computer-readable medium further comprises instructions that, when executed by the computing system, cause the computing system to: send the selected paths, including the object collision path, to the planning algorithm for use in planning a trajectory for the autonomous vehicle that is associated with a low probability of colliding with or taking a sudden evasive action to avoid the object.

Aspect 24: The non-transitory computer-readable medium of any of Aspects 18 to 23, the object path prediction algorithm is trained by being provided a labeled dataset including the information about the objects in the environment as perceived by the sensors of the autonomous vehicle, and subsequent trajectories observed to be traveled by the objects in the environment and the object path prediction algorithm is trained by being provided a labeled dataset including the information about the objects in the environment as perceived by the sensors of the autonomous vehicle, and subsequent trajectories observed to be traveled by the objects in the environment.

Aspect 25: The non-transitory computer-readable medium of any of Aspects 18 to 24, the labeled dataset is at least partially derived from road event data collected by the autonomous vehicle that includes a flag to indicate that an autonomous vehicle technical operator has taken over control of the autonomous vehicle, and the labeled dataset has labels to identify when the path traveled by the object was the object collision path.

What is claimed is:

1. A method for identifying an object collision path, the method comprising:
    operating an autonomous vehicle (AV) having a local computing device configured to execute a prediction stack and a planning stack, wherein the planning stack is configured to determine how to maneuver the AV within the environment:
    receiving, by an object path prediction algorithm, sensor data indicative of objects in an environment, the sensor data being generated by sensors of the AV;
    receiving, by the object path prediction algorithm, information about a location of the autonomous vehicle in the environment;
    determining, by the object path prediction algorithm, a set of predicted paths for an object from the objects in the environment based on the sensor data;
    outputting, from the object path prediction algorithm, selected paths from the set of predicted paths for the object, wherein the object path prediction algorithm is configured to output, to a planning algorithm, a fixed number of paths that are most likely to occur and a path that is considered an object collision path, the object collision path being a path that if taken by the object would result in the AV taking evasive action to avoid the object, wherein the object path prediction algorithm is a multimodal machine-learning prediction algorithm with a dedicated object collision head;
    outputting, via the dedicated object collision head, the object collision path to the planning stack of the AV; and
    executing the planning stack to control a maneuver of the AV based on the output object collision path.

2. The method of claim 1, wherein the multimodal machine-learning prediction algorithm further comprises a multi-class classification head, the method further comprising:
    outputting, via the multi-class classification head, probabilities associated with each mode of the multimodal machine-learning prediction algorithm, wherein the probabilities have a sum of 1.

3. The method of claim 2, wherein the multimodal machine-learning prediction algorithm further comprises a binary classification head, the method further comprising:
    outputting, via the binary classification head, a binary label characterizing whether the object collision path is relevant or not to the planning algorithm.

4. The method of claim 3, wherein the planning algorithm uses the binary classification output to calibrate the relevancy of the object collision path.

5. The method of claim 1, further comprising:
    sending the selected paths including the object collision path to the planning algorithm for use in planning a trajectory for the autonomous vehicle that is associated with a low probability of colliding with or taking a sudden evasive action to avoid the object.

6. The method of claim 1, wherein the object path prediction algorithm is trained by being provided a labeled dataset including the sensor data, and subsequent trajectories observed to be traveled by the objects in the environment, wherein the subsequent trajectories are labeled to identify when a path traveled by the object was an object collision path.

7. The method of claim 6, wherein the labeled dataset is at least partially derived from road event data collected by the autonomous vehicle that includes a flag to indicate that an autonomous vehicle technical operator has taken over control of the autonomous vehicle, and the labeled dataset has labels to identify when the path traveled by the object was the object collision path.

8. A system for identifying an object collision path from a trained object path prediction algorithm, comprising:
    a storage configured to store instructions;
    a processor configured to execute the instructions and cause the processor to:
        operate an autonomous vehicle (AV), wherein the processor is configured to execute a prediction stack and a planning stack, wherein the planning stack is configured to determine how to maneuver the AV within the environment:
        receive, by an object path prediction algorithm of the prediction stack, sensor data indicative of objects in an environment, the sensor data being generated by sensors of the AV;
        receive by the object path prediction algorithm, information about a location of the autonomous vehicle in the environment;
        determine, by the object path prediction algorithm, a set of predicted paths for an object from the objects in the environment;

output, from the object path prediction algorithm, selected paths from the set of predicted paths for the object, wherein the object path prediction algorithm is configured to output, to the planning stack, a fixed number of paths that are most likely to occur and a path that is considered an object collision path, the object collision path being a path that if taken by the object would result in the AV taking evasive action to avoid the object, wherein the object path prediction algorithm is a multimodal machine-learning prediction algorithm with a dedicated object collision head, wherein the processor is configured to execute the instructions and cause the processor to: output, via the dedicated object collision head, the object collision path; and control a maneuver of the AV based on the output object collision path.

9. The system of claim 8, wherein the multimodal machine-learning prediction algorithm further comprises a multi-class classification head, wherein the processor is configured to execute the instructions and cause the processor to:
output, via the multi-class classification head, probabilities associated with each mode of the multimodal machine-learning prediction algorithm, wherein the probabilities have a sum of 1.

10. The system of claim 9, wherein the multimodal machine-learning prediction algorithm further comprises a binary classification head, wherein the processor is configured to execute the instructions and cause the processor to:
output, via the binary classification head, a binary label characterizing whether the object collision path is relevant or not to the planning algorithm.

11. The system of claim 10, wherein the planning algorithm uses the binary classification output to calibrate the relevancy of the object collision path.

12. The system of claim 8, wherein the processor is configured to execute the instructions and cause the processor to:
send the selected paths including the object collision path to the planning algorithm for use in planning a trajectory for the autonomous vehicle that is associated with a low probability of colliding with or taking a sudden evasive action to avoid the object.

13. The system of claim 8, wherein the object path prediction algorithm is trained by being provided a labeled dataset including the information about the objects in the environment as perceived by the sensors of the autonomous vehicle, and subsequent trajectories observed to be traveled by the objects in the environment, wherein the subsequent trajectories are labeled to identify when a path traveled by the object was an object collision path.

14. The system of claim 13, wherein the labeled dataset is at least partially derived from road event data collected by the autonomous vehicle that includes a flag to indicate that an autonomous vehicle technical operator has taken over control of the autonomous vehicle, and the labeled dataset has labels to identify when the path traveled by the object was the object collision path.

15. A non-transitory computer-readable medium comprising instructions, the instructions, when executed by a computing system, cause the computing system to:
operate an autonomous vehicle (AV), wherein the computing system is configured to execute a prediction stack and a planning stack, wherein the planning stack is configured to determine how to maneuver the AV within the environment:
receive, by an object path prediction algorithm of the prediction stack, sensor data indicative of objects in an environment, the sensor data being generated by sensors of the AV;
receive, by the object path prediction algorithm, information about a location of the autonomous vehicle in the environment;
determine, by the object path prediction algorithm, a set of predicted paths for an object from the objects in the environment;
output, from the object path prediction algorithm, selected paths from the set of predicted paths for the object, wherein the object path prediction algorithm is configured to output, to the planning stack, a fixed number of paths that are most likely to occur and a path that is considered an object collision path, the object collision path being a path that if taken by the object would result in the AV taking evasive action to avoid the object, wherein the object path prediction algorithm is a multimodal machine-learning prediction algorithm with a dedicated object collision head;
outputting, via the dedicated object collision head, the object collision path; and controlling a maneuver of the AV based on the output object collision path.

16. The non-transitory computer-readable medium of claim 15, wherein the multimodal machine-learning prediction algorithm further comprises a multi-class classification head, wherein the instructions further caused to the computing system to:
output, via the multi-class classification head, probabilities associated with each mode of the multimodal machine-learning prediction algorithm, wherein the probabilities have a sum of 1.

17. The non-transitory computer-readable medium of claim 16, wherein the multimodal machine-learning prediction algorithm further comprises a binary classification head, wherein the instructions further caused to the computing system to:
output, via the binary classification head, a binary label characterizing whether the object collision path is relevant or not to the planning algorithm.

* * * * *